United States Patent [19]

Fettweis et al.

[11] 3,919,671

[45] Nov. 11, 1975

[54] DIGITAL FILTER

[75] Inventors: Alfred Fettweis; Axel Sedlmeyer, both of Bochum, Germany

[73] Assignee: Siemens Aktiengesellschaft, Berlin & Munich, Germany

[22] Filed: Dec. 19, 1973

[21] Appl. No.: 426,090

[30] Foreign Application Priority Data

Dec. 22, 1972 Germany .......................... 2263087

[52] U.S. Cl. .............. 333/70 R; 328/167; 333/70 A

[51] Int. Cl.[2] .......................................... H03H 7/10

[58] Field of Search .......... 328/167; 333/70 R, 70 A

[56] References Cited

UNITED STATES PATENTS 3,537,015 10/1970 Jackson .............................. 328/167

3,599,108 8/1971 Gardner ........................... 333/70 A

*Primary Examiner*—James W. Lawrence

*Assistant Examiner*—Marvin Nussbaum

*Attorney, Agent, or Firm*—Hill, Gross, Simpson, Van Santen, Steadman, Chiara & Simpson

[57] ABSTRACT

An improved filter technique, as for example, for use with ladder digital filters which allows any LC-ladder filter to be simply translated into a corresponding digital structure. If one of the characteristics of an adaptor is chosen equal to unity, the output of that adaptor will be independent of the input which means that the direct path between the input and output is interrupted, thus eliminating undesirable closed loops to exist. The invention also provides for isolation between input and output ports in filter elements without the use of delay devices.

9 Claims, 15 Drawing Figures

DIGITAL FILTER

FIELD OF THE INVENTION

This invention relates in general to filters and in particular to a novel digital type filter which is of simple and compact design.

DESCRIPTION OF THE PRIOR ART

German Pat. No. 2,027,303 discloses a wave digital filter, and particularly of the ladder type. In such filters, a direct connection between adaptor circuits should be avoided and unit elements between series and shunt branches have been used to prevent feedback paths which would violate the realizability (causality) condition.

For extensive technical discussion of wave digital filters, reference should be made to the following publications.

1. A. Fettweis, "Entwurf von Digitalfiltern in Anlehnung an Verfahren der klassischen Netzwerktheorie," NTZ-Report of the NTG Convention of Experts "Analysis and Synthesis of Networks," Stuttgart, 17–20, Oct. (1970).

2. J. A. Bingham, "A new type of digital filter with a reciprocal ladder configuration," IEEE International Symposium on Circuit Theory, Digest of Technical Papers, 129–130 (1970).

3. A. Fettweis, "Digital filter structures related to classical filter networks" Archives for Electronics and transmission technique, volume 25, 79–89 (1970).

4. A. Fettweis, "Some principles of designing digital filters imitating classical filter structures" IEE Trans. Circuitry Theory, CT–18 No. 2, 314–316 (1970)

5. A. Fettweis, "Wave digital filters," Proceedings of the Summers School on Circuit Theory, Institute of Radio Engineering and Electronics, Czechoslovak Academy of Sciences, 11-1 to 11-10 (1971).

6. A. Fettweis, "On the connection between multiplier word length limitation and roundoff noise in digital filters," IEEE Trans. Circuit Theory, CT–19, September 1972, Pages 486–491.

7. A. Fettweis, "Pseudo passivity, sensitivity, and stability of wave digital filters," IEEE Trans. Circuitry Theory, CT–19, November (1972).

8. R. E. Crochiere, "Digital ladder structures and coefficient sensitivity," IEEE Trans. Audio and Electroacoustics, Vol. AU–20, Sept. (1972), pages 240–246.

9. A Chu and R. E. Crochiere, "Comments and experimental results on optimal digital ladder structures," IEEE Trans. Audio and Electroacoustics, Vol. AU–20, September (1972), Pages 317–318.

10. A. Fettweis, "Scattering properties of wave digital filters," Proceedings of the Seminar on Digital Filtering, Florenz, September 1972, pages 1 to 8.

11. L. Fraiture and J. Neirynick, "Theory of unit-element filters," Revue HF, Vol. 7, 325–340 (1969).

12. A. Fettweis, "Cascade synthesis of lossless twoports by transfer matrix factonization," Network Theory (edited by R. Boite), 43–103, Gordon and Breach, New York, 1972, as well as B. Gold and C. M. Rader, "Digital Processing of Signals," 151–152, McGraw Hill, New York, 1969.

SUMMARY OF THE INVENTION

The invention relates to a filter with frequency dependent transmission characteristics for electrical analog signals which exist in digital form whereby the filter basic circuit corresponds to a common LC circuit for analog signals, preferably of a ladder type and whereby the reactive two terminal circuit elements of the filter are designed as single port circuits subject to transit time and conductive elements as two port circuits. Scanning techniques whereby single port and multiport circuits are switched together via a port resistance arrangement between the individual adaptors are provided.

In wave digital filters of the ladder type such as described in literature references 1, 3, 4 and 5 above, a direct connection of the adaptor circuits should be avoided. This is solved by providing in each series or parallel branch a unit element before the next series or parallel branch. German Pat. No. 2,027,303 and particularly on page 27 in the first paragraph, and on pages 33 to 35 describes such arrangements. These unit elements improve the performance of the filter circuit of the type covered by items 11 and 12 of the attached literature index, however, the improvement is not as complete as in the case of inductances and capacitances. Literature numeral 3 listed above illustrates how unit elements can be inserted into the entire circuit without requiring additional multipliers. However, this causes difficulties in use of common filter computation methods and requires costly processes for optimizing the filter arrangement.

The present invention solves these problems and makes a direct connection between arbitrarily chosen adaptation members by selecting certain parameters in the adaptation circuit.

In the invention network points which require a direct connection of two adaption circuits whereby at least one has a minimum of three ports, the adaptation circuit is provided with decoupling between the input and output via at least one of the ports. The port which is to be connected to the other adaptation circuit has a port resistance which corresponds to the port of the first adaptation circuit which is decoupled relative to the input and output terminals.

Adaptor circuits having at least three ports for which the decoupling between the input and output terminals is realized at the port provided for the direct connection are referred to in the following specification as direct adaptors.

When this circuit technique utilizing direct adaptors is supplied to a filter in a ladder type circuit, a complete coincidence in the filter supplement diagram can be obtained which means that each known ladder type filter can be transferred directly into a wave digital filter. Thus all conventional filter calculating methods, including the filter design tables can be used for calculating individual wave digital filters.

A further advantageous development of the invention lies in the fact that in the adaptor circuit which contains the port which is decoupled due to the input and output terminals, a decoupling element is provided in that the multiplier which is provided for that particular port in the circuit utilizes a multiplication factor of 1 or is replaced by a through connection. This means that $n-2$ multipliers are required in the case of $n$ ports, if one of the $n$ ports is chosen as a dependent gate or $n-1$ multipliers respectively if neither of the $n$ ports is selected as the dependent port. Thus, the number of multipliers in a wave digital filter is equal to the number of degrees of freedom in the filter diagram with concentrated inductances and capacitances upon which the design is based. The present invention allows the total number of multipliers to be decreased. If it is desirable to further decrease the number of multipliers in the individual adaptor circuits, such can be done according to the teachings of German Pat. No. 2,027,303 by choosing the port resistances of certain ports to be equal to each other.

The invention can be further developed so that in case of an adaptor circuit with $n$ ports ($n$ greater than 3) that the port resistances $p$ of a number of the ports chosen to be equal to each other, and this will result in the number $m$ of the multipliers provided in the adaptor circuit to be equal to the equation $m = n-1-p$.

The above equation holds if one port is a dependent port. If a port is not a dependent port, the equation $m = n-p$ is applicable.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure, and in which:

DESCRIPTION OF THE PREFERRED EMBODIMENTS

An adaptor has $n$ ports with $n>2$, which can be numbered $\nu = 1, 2, \ldots n$. To each port $\nu$ there corresponds an arbitrary port resistance $R_\nu$, an incident signal wave $a_\nu$, and a reflected signal wave $b_\nu$. Instead of the instantaneous signal quantities $a_\nu$ and $b_\nu$, the corresponding steady-state signals $A_\nu$ and $B_\nu$ may also be used.

For reasons of simplicity in this application, only the instantaneous signals will be considered.

Figures 1A, 1B, 2, 3A:
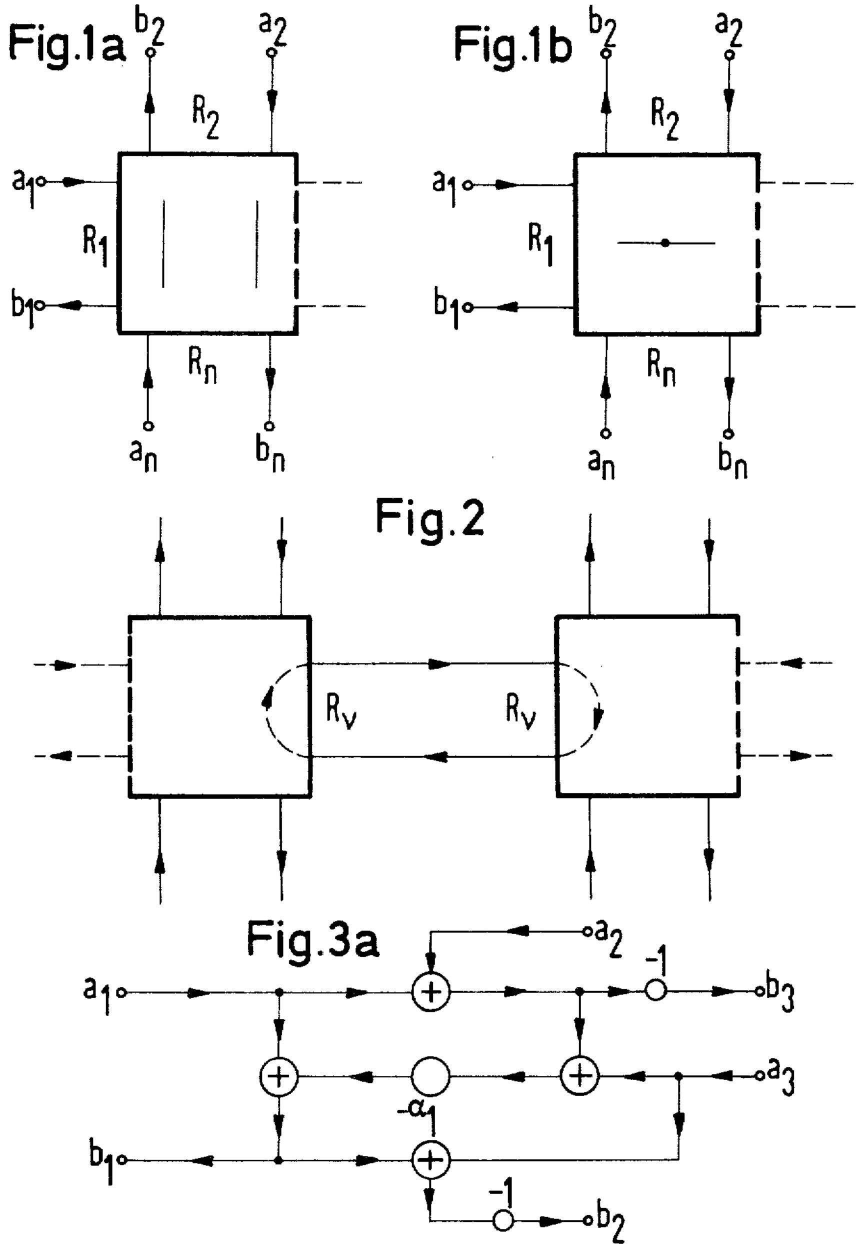
FIG. 1*a* illustrates an $n$-port parallel adapter.
FIG. 1*b* illustrates an $n$-port series adapter.
FIG. 2 illustrates the direct interconnection of two ports of two arbitrary adapters.
FIG. 3*a* is a signal flow diagram of a three-port series adapter, whereby port 2 is the dependent port.

FIG. 1*a* illustrates a parallel adaptor which is used to interconnect $n$ ports in parallel. It is described by the equations $$b_\nu = a_0 - a_\nu, \quad a_0 = \sum_{\nu=1}^{n} \alpha_\nu a_\nu \qquad (1a, b)$$

where $$\alpha_\nu = 2G_\nu/G, \qquad G_\nu = 1/R_\nu, \qquad (2a, b)$$

$$G = G_1 + G_2 + \ldots + G_n. \qquad (3)$$

A series adaptor serves to interconnect $n$ ports in series as shown in FIG. 1*b*. It is described by the equations $$b_\nu = a_\nu - \alpha_\nu a_0, \qquad a_0 = a_1 = a_2 + \ldots + a_n \qquad (4a, b)$$

where $$\alpha_\nu = 2R_\nu/R, \qquad R = R_1 + R_2 + \ldots + R_n \qquad (5a, b)$$

In both cases, the $\alpha_\nu$ satisfy the relations $$\alpha_1 + \alpha_2 + \ldots + \alpha_n = 2 \qquad (6a, b)$$

Obviously, each reflected signal $b_\nu$ depends, in general, on all the signals incident to the corresponding adaptor, and thus in particular on that $a_\nu$ whose subscript $\nu$ is the same as for the $b_\nu$ under consideration. Hence, in the signal-flow diagrams corresponding to equations (1) and (4), a direct path leads, in general, from any incident signal $a_\nu$ to the corresponding reflected signal $b_\nu$.

Assume then that two arbitrary adaptors are directly interconnected, as shown in FIG. 2 (the symbols indicating the particular nature of the adaptors have been omitted because they are irrelevant for the present purpose). According to the known principles (see publications 1, 3 and 5), which apply for any interconnection of wave n-ports, the port resistances of the two interconnected ports must be the same, and the reflected wave of the one port must become the incident wave of the other. In particular, a closed loop not containing any delay would thus normally exist as shown in FIG. 2, when the resulting signal-flow diagram would be unrealizable, i.e., no properly ordered sequence for the actually required computations could be given (see publications 1, 3–5, 14). This drawback has been overcome as shown in the publications 1–5 by requiring a delay to be inserted, possibly corresponding to a cascaded unit element as discussed above.

A much simpler solution, however, arises as follows. Assume that for an adaptor, one of the $\alpha_\nu$ may be chosen equal to unity, say $$\alpha_n = 1,$$

which, according to equations (2), (3), and (5), implies for the parallel adaptor $$G_n = G_1 + G_2 + \ldots + G_{m-1} \qquad (7)$$

and for the series adaptor $$R_n = R_1 + R_2 + \ldots + R_{n-1}. \qquad (8)$$

In this case, for the parallel adaptor, equation (1*a*) can, for $\nu = n$, be written in the form $$b_n = \alpha_1 a_1 + \alpha_2 a_2 + \ldots + \alpha_{n-1} a_{n-1}, \qquad (9)$$

and, for the series adaptor, equation (4*a*), for $\nu = n$, in the form $$b_n = -a_1 - a_2 - \ldots - a_{n-1}. \quad (10)$$

Consequently, in both cases, the expression for $b_n$ becomes independent of $a_n$, i.e., in the signal-flow diagram of the adaptor, the direct path normally leading from $a_n$ to $b_n$ is interrupted. Hence, the port $n$ may now be connected to a port of another adaptor without danger of a forbidden closed loop existing. In particular, for this last port, no requirement of the type just discussed does exist.

Equation (6) may now be replaced by $$\alpha_1 + \alpha_2 + \ldots + \alpha_{n-1} = 1 \quad (11)$$

Figure 3B:
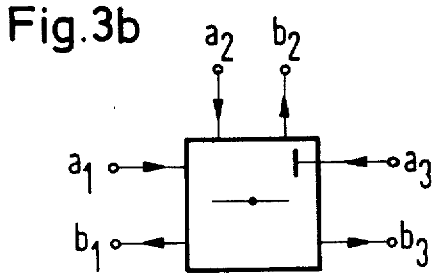
FIG. 3*b* illustrates a three-port structure in block form.

The last relation still allows one of the $\alpha_1$ to $\alpha_{n-1}$ to be expressed in terms of the other, i.e., the corresponding multiplier to be eliminated, as is also the case for the adaptors in the general theory (see publications 1–5). The port corresponding to the eliminated multiplier may again be called the dependent port. An example of a three-port series adaptor with $\alpha_3 + 1$, for which port 2 is the dependent port, is shown in FIG. 3.

Mathematically for the three-port circuit (parallel adaptor) the following applies $$b_1 = \alpha_1 a_1 + \alpha_2 a_2 + \alpha_3 a_3 - a_1 \quad (12)$$

$$b_2 = \alpha_1 a_1 + \alpha_2 a_2 + \alpha_3 a_3 - a_2 \quad (13)$$

$$b_3 = \Delta_1 a_1 + \alpha_2 a_2 + \alpha_3 a_3 - a_3 \quad (14)$$

If, for example, $\alpha_3 = 1$, the equation for $b_3$ will be as follows:

$$b_3 = \alpha_1 a_1 + \alpha_2 a_2 + a_3 - a_3 \quad (15)$$

$$b_3 = \alpha_1 a_1 + \alpha_2 a_2; \quad (16)$$

that means, $b_3$ is independent from $a_3$.
Because equation (6) also applies:
$\alpha_1 + \alpha_2 + \alpha_3 = 2$ and thus because $\alpha_3 = 1$
also, $\alpha_1 + \alpha_2 = 1$ (17 $a$, $b$)

If neither of the three ports is chosen as a dependent port, $\alpha_1$ and $\alpha_2$ have to be realized as multipliers. In that case $n - 1 = 3 - 1 = 2$ multipliers are required. Since, however, $\alpha_1 + \alpha_2 = 1$, for instance port 1 can be chosen as a dependent port; this means that the multiplier $\alpha_1$ can be constituted indirectly by $\alpha_2$ which means that $\alpha_1 = 1 - \alpha_2$. By using this relation as well as the relation $\alpha_3 = 1$, the equations (12), (13), (14) can be written in the form $$b_1 = \alpha_2 (a_2 - a_1) + a_3 \quad (18)$$

$$b_2 = a_1 + \alpha_2 (a_2 - a_1) + a_3 - a_2 \quad (19)$$

$$b_3 = a_1 + \alpha_2 (a_2 - a_1) \quad (20)$$

Thus only one multiplier is required in the circuit $$(n - 2 = 3 - 2 = 1). \quad (21)$$

In the following paragraphn an example is given for the number of multipliers with $n = 4$ (parallel adaptor).

$$b_1 = \alpha_1 a_1 + \alpha_2 a_2 + \alpha_3 a_3 + \alpha_4 a_4 - a_1 \quad (22)$$

$$b_2 = \alpha_1 a_1 + \alpha_2 a_2 + \alpha_3 a_3 + \alpha_4 a_4 - a_2 \quad (23)$$

$$b_3 = \alpha_1 a_1 + \alpha_2 a_2 + \alpha_3 a_3 + \alpha_4 a_4 - a_3 \quad (24)$$

$$b_4 = \alpha_1 a_1 + \alpha_2 a_2 + \alpha_3 a_3 + \alpha_4 a_4 - a_4 \quad (25)$$

If, for instance, $\alpha_4 = 1$, the equation for $b_4$ will be as follows:

$$b_4 = \alpha_1 a_1 + \alpha_2 a_2 + \alpha_3 a_3 \quad (26)$$

which means $b_4$ is independent of $a_4$.
Because equation (6) also applies, the following equation is obtained:

$$\alpha_1 + \alpha_2 + \alpha_3 + \alpha_4 = 2 \quad (27)$$

and thus because $$\alpha_4 = 1, \text{ also } \alpha_1 + \alpha_2 + \alpha_3 = 1 \quad (28)$$

Case $a$: If neither of the four ports is chosen as a dependent port, $\alpha_1$, $\alpha_2$ and $\alpha_3$ have to be realized as multipliers (this means $n-1 = 4-1 = 3$) multipliers are required.
Case $a1$: If, however, for instance, the port resistance 2 is chosen equal to the port resistance 3, $P = 2$ applies and $\alpha_2 = \alpha_3 = \alpha$: and according to equation (28), $$\alpha_1 + 2\alpha = 1 \quad (29)$$

This means, $\alpha_1$ and $\alpha$ have to be realized as multipliers. In that case, only $n - p = 4 - 2 = 2$ multipliers are required.
Case $b$: Since, however, $$\alpha_1 + \alpha_2 + \alpha_3 = 1 \quad (30)$$

for instance port 1 can be chosen as a dependent port, this means that the multiplier $\alpha_1$, and indirectly also $\alpha_2$ and $\alpha_3$ are defined by $$\alpha_1 = 1-\alpha_2-\alpha_3 \tag{31}$$

Thus, only two multipliers ($n - 2 = 4 - 2 = 2$) have to be realized in the circuit.

Case $b1$: If, however, for instance the port resistance 2 is chosen equal to the port resistance 3, $p = 2$ will apply and $\alpha_2 = \alpha_3 = \alpha$ and according to equation (28), $\alpha_2 + 2\alpha = 1$.

If, for instance, port 1 is chosen as a dependent port this would mean that the multiplier $\alpha_1$ is illustrated indirectly by $\alpha$ that means, according to $\alpha_1 = 1 - a\alpha$. By using this relation as well as the relation $\alpha_4 = 1$ the equations (22), (23), (24) and (25) can be transferred into the form:

$$b_1 = \alpha(a_2 + a_3 - 2a_1) + a_4 \tag{32}$$

$$b_2 = a_1 + \alpha(a_2 + a_3 - 2a_1) + a_4 - a_2 \tag{33}$$

$$b_3 = a_1 + \alpha(a_2 + a_3 - 2a_1) + a_4 - a_3 \tag{34}$$

$$b_4 = a_1 + \alpha(a_2 + a_3 - 2a_1) \tag{35}$$

Thus, only one multiplier is required in the circuit, since $n - 1 - P = 4 - 1 - 2 = 1$.

It may seen at first that a requirement such as equations (7) or (8) freezes one degree of freedom which actually must be available for realizing the element values of the original filter. In reality, however, if two ports of two adaptors are interconnected, no further circuit or element, clearly, will be connected to these ports (compare the rules for the realization of circuits disclosed in publications 1, 3–5). Hence, the common value of their port resistances is not imposed by the original filter from which the digital filter is to be derived and can thus be chosen freely. In particular, it may always be chosen according to equation (7) for a parallel adaptor and according to equation (8) for a series adaptor.

From the discussion given in the previous section, it is clear that adaptors may be interconnected in a large variety of ways. For filter applications, the most important of these ways of interconnection are those which correspond to ladder structures. For illustration, we may thus restrict ourselves to this case.

Figure 4:
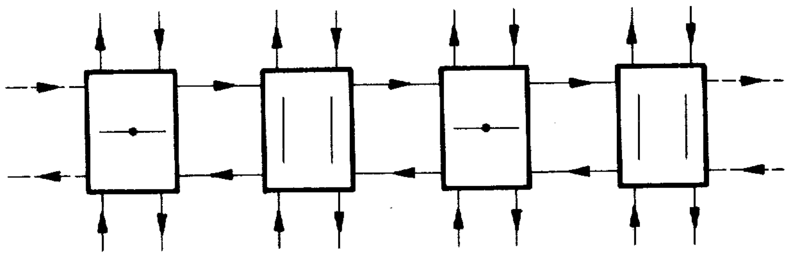
FIG. 4 shows a series and parallel four-port network.

Circuits corresponding to ladder structures, clearly, are obtained if we connect alternately in cascade any number of parallel and series adaptors, as shown schematically in FIG. 4. For the interconnections to be permissible, it is then sufficient that for any two interconnected ports the $\alpha_r$ corresponding to one of them be equal to unity, and in the cascade arrangement, obviously, this can always be achieved.

For all adaptors in FIG. 4, the number of ports not entering the cascading operation is arbitrary, although it will usually be 1 or 2, or at most 3 (in FIG. 4, two such ports are always shown). To each of these ports, we may connect a simple delay T (corresponding to a capacitance — see publications 1–5), a delay T with a sign inversion (corresponding to an inductance — publications 1–5) or a variety of other arrangements, including arrangements comprising further adaptors, e.g., such ones which correspond to arbitrary reactances (publications 1, 3–5); even arrangements beginning with an additional adaptor are not excluded.

Figure 5A:
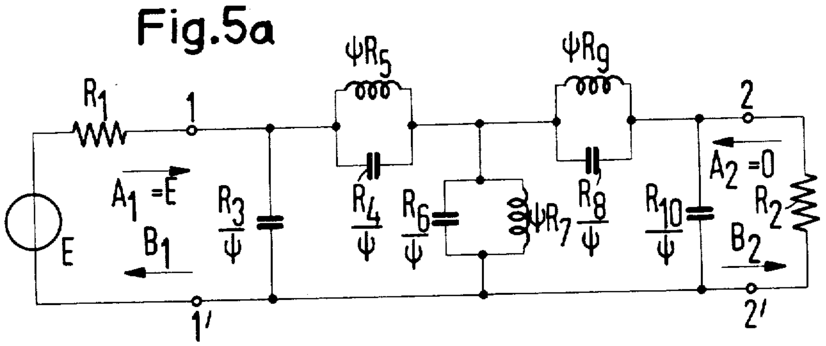
FIG. 5*a* is an electrical schematic of a band-pass ladder filter.
Figures 5B, 7:
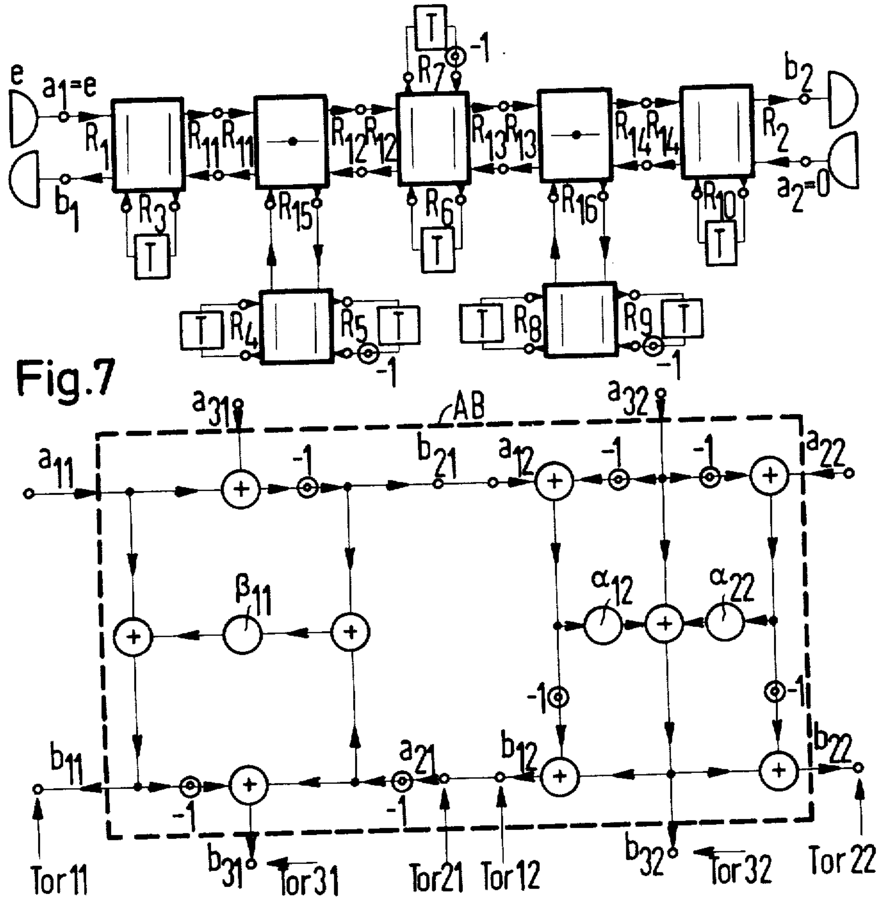
FIG. 5*b* illustrates a ladder digital filter.
FIG. 7 illustrates the connection of two-port terminal devices.

As an example, we consider the band-pass LC-filter shown in FIG. 5*a*, wherein resistors, capacitors and inductors are arranged as shown. For each element in FIG. 5*a*, the corresponding impedance value is given, the parameter $\psi$ corresponding to the equivalent complex frequency defined by $$\psi = \tanh\,(pT/2) \tag{36}$$

where $p$ is the actual complex frequency and $T$ the operating period of the circuit. A ladder digital filter (realizable signal-flow network) corresponding to FIG. 5*a* is shown in FIG. 5*b*.

For $R_7$ = infinity, this filter reduces to a low-pass.

The resistances $R_1$ to $R_{10}$ are imposed by the design of the LC-filter. There are various possiblities of choosing the resistances $R_{11}$ to $R_{16}$ in accordance with the requirements corresponding to equations (7) and (8). If we choose, at each interconnection of adaptor ports, the left-hand port to correspond to $\alpha_r = 1$, we obtain $$G_{11} = G_1 + G_3, \quad R_{12} = R_{11} + R_{15}, \quad G_{15} = G_4 + G_5 \tag{37 a, b, c}$$

$$G_{13} = G_6 + G_7 + G_{12}, \quad R_{14} = R_{13} + R_{16}, \quad G_{16} = G_8 + G_9 \tag{38 a, b, c}$$

and if we choose the right-hand port, $$G_{14} = G_{12} + G_{10}, \quad R_{13} = R_{14} + R_{16}, \quad G_{16} = G_8 + G_9 \tag{39 a, b, c}$$

$$G_{12} = G_6 + G_7 + G_{13}, \quad R_{11} = R_{12} + R_{15}, \quad G_{15} = G_4 + G_5, \tag{40 a, b, c}$$

where in all cases, $G_r = 1/R_r$, the total number of adaptor ports in FIG. 5*b* is 22. In order to arrive at the total number of multipliers we have to deduct from this the number of dependent ports, i.e., 7, (equal to the number of adaptors), and the number of ports whose $\alpha_r$ is equal to unity, i.e., 6 (equal to the number of direct interconnections between adaptors). Hence, the structure of FIG. 5*b* requires a total of $22 - 7 - 6 = 9$ multipliers. This corresponds precisely to the number of degrees of freedom in the original LC-structure of FIG. 5*a* (number of resistive parameters minus one). It is easily checked that these results hold generally.

The validity of the theory has been vertified by a simple numerical example, in the frequency and time domains.

In this application only true ladder filters have been discussed. It should be clear, however, that the present procedures can be used in quite arbitrary combinations with those described in earlier publications 1–5. In other words, digital filters can be designed in such a way that certain substructures inside of them are realized as true ladder structures while others include interconnecting unit element elements. Hence, a large variety of mixed structures are available. For all of these, the basic properties of pseudo-passivity, pseudo-losslessness, and stability, and thus also the excellent properties with respect to attenuation sensitivity and round-off noise (publications 1–11), obviously, remain valid.

It should be pointed out in particular that interconnected adaptors can also be transferred as a whole according to conventional methods into equivalent signal flow circuits. Two examples are described below as further developments of the invention.

Figure 6:
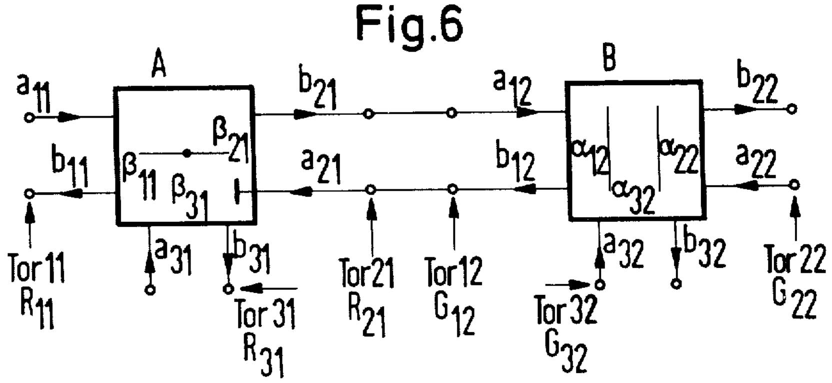
FIG. 6 illustrates the connection of three-port shunt and series adaptors.
Figures 8, 9:
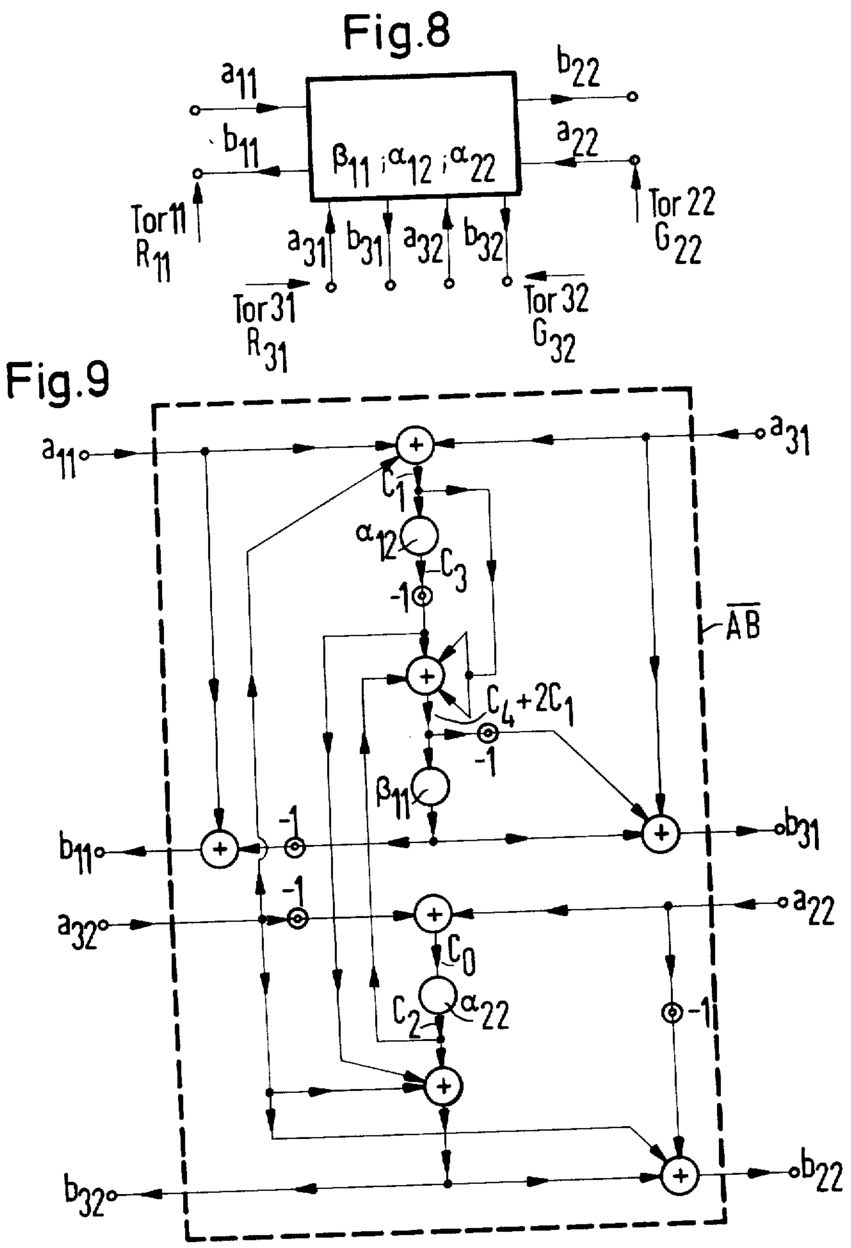
FIG. 8 illustrates a four-port device.
FIG. 9 illustrates a four-part device.

The interconnection of two adaptors illustrated as shown in the FIGS. 6 and 7 can be transferred into an equivalent signal flow circuit as shown in FIG. 9 which corresponds to the symbolic illustration of FIG. 8.

For this purpose it is first of all assumed that the ports 31 and 32 are chosen as dependent ports and in addition $B_{21} = 1$. If the structure which is created by the interconnection of the two adaptors A and B is again considered as an adaptor it can again be described by the wave equations at its ports and its signal flow circuit can be stated. This is to be explained in detail as follows. According to FIG. 6 for the waves in case of the adaptor A the following applies:

$$b_{11} = a_{11} - \beta_{11} (a_{11} + a_{21} + a_{31}) \qquad (41)$$

$$b_{21} = a_{21} - \beta_{21} (a_{11} + a_{21} + a_{31}) \qquad (42)$$

$$b_{31} = a_{31} - \beta_{31} (a_{11} + a_{21} + a_{31}) \qquad (43)$$

and for the waves in case of adaptor B $$b_{12} = \alpha_{12}a_{12} + \alpha_{22}a_{22} + \alpha_{32}a_{32} - a_{12} \qquad (44)$$

$$b_{22} = \alpha_{12}a_{12} + \alpha_{22}a_{22} + \alpha_{32}a_{32} - a_{22} \qquad (45)$$

$$b_{32} = \alpha_{12}a_{12} + \alpha_{22}a_{22} + \alpha_{32}a_{32} - a_{32} \qquad (46)$$

and for the point of the interconnection of the two adaptors $$b_{21} = a_{12} \qquad (47)$$

$$a_{21} = b_{12} \qquad (48)$$

Furthermore, it has to apply that at this point the port resistances are equal, which means $$R_{21} = \frac{1}{G_{12}} \qquad (49)$$

For the transformed adaptors AB according to FIG. 4 in the wave equations $a_{12}$, $b_{12}$, $a_{21}b_{21}$ are not allowed to occur. After a corresponding insertion of the equations (47) and (48) into the equations (41) to (46) and for this example choose $\beta_{21} = 1$ and dependent port 31 (corresponding to $\beta_{31} = 1 - \beta_{11}$) as well as the dependent port 32 (corresponding $\alpha_{32} = 2 - \alpha_{12} - \alpha_{22}$), the following wave equations are obtained.

$$b_{11} = a_{11} - \beta_{11} \cdot [2C_1 + C_4] \qquad (50)$$

$$b_{31} = a_{31} = [2C_1 + C_4] + \alpha_{11} \cdot [2C_1 + C_4] \qquad (51)$$

$$b_{22} = C_4 - a_{22} + 2a_{32} \qquad (52)$$

$$b_{32} = C_4 + a_{32} \qquad (53)$$

with $$C_o = (a_{22} - a_{32}) \qquad (54)$$

$$C_1 = (a_{11} + a_{31} + a_{32}) \qquad (55)$$

$$C_2 = \alpha_{22} C_0 \qquad (56)$$

$$C_3 = \alpha_{12} C_1 \qquad (57)$$

$$C_4 = -C_3 + C_2 \qquad (58)$$

$$\beta_{11} = \frac{R_{11}}{R_{11} + R_{31}};\ \alpha_{12} = \frac{2\frac{1}{R_{11} + R_{31}}}{\frac{1}{R_{11} + R_{31}} + G_{22} + G_{32}}; \qquad (59a, b)$$

$$\alpha_{22} = \frac{2\,G_{22}}{\frac{1}{R_{41} + R_{31}} + G_{22} + G_{32}} \qquad (60)$$

and therefrom the signal flow circuit AB shown in FIG. 9 results.

For a filter circuit here for instance port 11 can be considered as an input port and port 22 as an output port; and in that case corresponding digitally realized reactances are switched to the ports 31 and 32.

Naturally, it is also possible to make $\alpha_{22} = 1$. In that case, $G_{22} = G_{12} + G_{32}$ is obtained and analogous to FIG. 6 a further series adaptor can be connected. The three adaptors can again be transferred into an equivalent signal flow circuit corresponding to the shown transformation possibility.

The transformation is not restricted in respect to the contained adaptors nor as to the sequence of their interconnection, so that an entire filter network can be transformed into an equivalent signal flow circuit.

Figure 10:
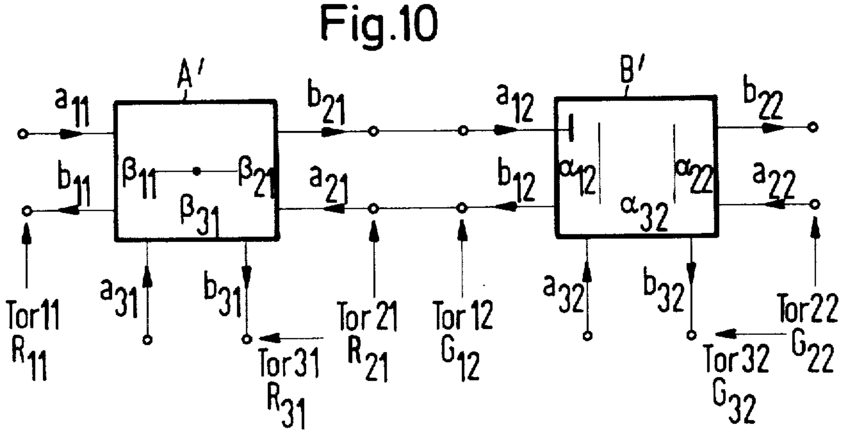
FIG. 10 illustrates the connection of two three-port devices.
Figure 11:
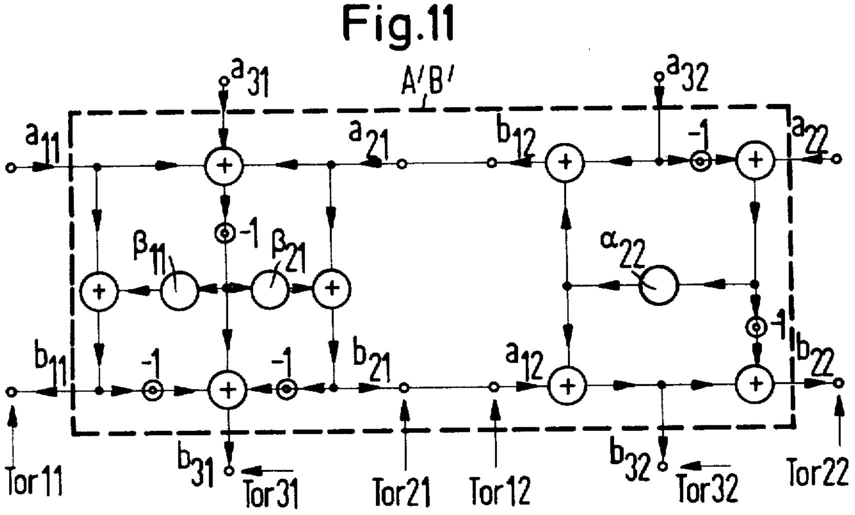
FIG. 11 illustrates the connection of two three-port devices.
Figure 12:
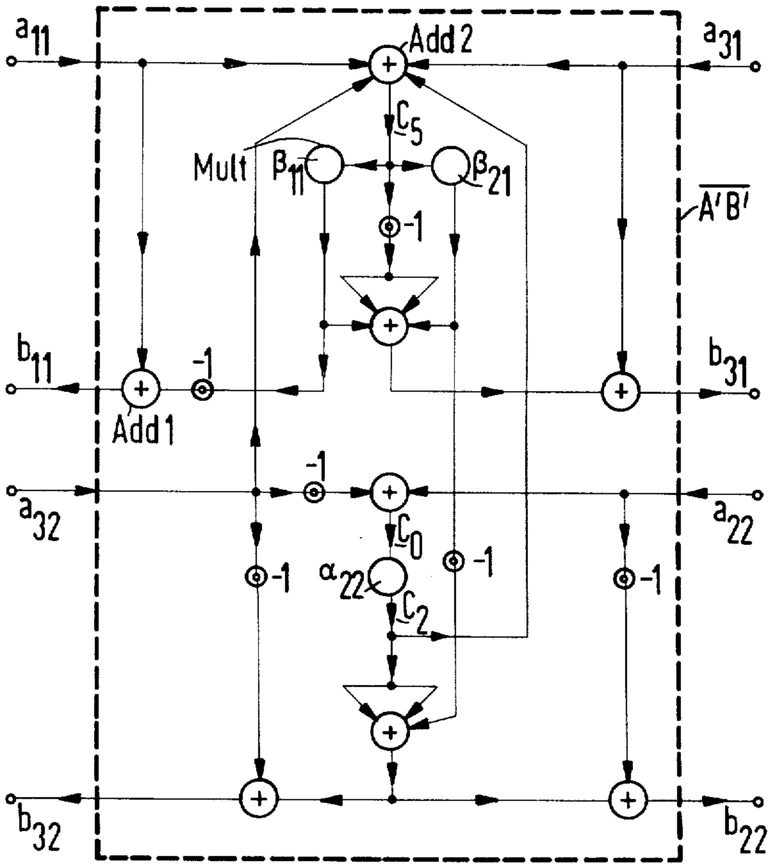
FIG. 12 illustrates the connection of two four-port devices.

Thus, further equivalent signal flow circuits can be obtained, irrespective of which multipliers are made unity. Figures 10, 11 and 12 show an example of this. Also here the equations (41) to (49) apply. For the transformed adaptor (chosen as the dependent ports are again the ports 31 and 32) the example according to FIGS. 10 to 12 should be $\alpha_{12} = 1$.
Thus $$\beta_{31} = 2 - \beta_{11} - \beta_{21} \qquad (61)$$

results and $$\alpha_{32} = 1 - \alpha_{22}$$

(62)

The equations 54, 55, 56 and $C_5 = C_1 + C_2$ are combined, and the following wave equations are obtained:

(63)

$$b_{11} = a_{11} - \beta_{11} C_5$$

(64)

$$b_{31} = a_{31} - 2C_5 + \beta_{11} C_5 + \beta_{21} C_5$$

(65)

$$b_{22} = 2C_2 - \beta_{21} C_5 - a_{22} \quad (66)$$

$$b_{32} = 2C_2 - \beta_{21} C_5 - a_{32} \quad (67)$$

$$\alpha_{22} = \frac{G_{22}}{G_{22} + G_{32}}; \quad \beta_{12} = \frac{2\,\dfrac{1}{G_{22} + G_{32}}}{R_{11} + \dfrac{1}{G_{12} + G_{32}} + R_{13}} \quad (68a, b)$$

$$\beta_{11} = \frac{2R_{11}}{R_{11} + \dfrac{1}{G_{22} + G_{32}} + R_{13}} \quad (69)$$

Therefrom for the adaptor circuits A′ and B′ an equivalent signal flow circuit A′B′ results according to FIG. 12.

For deriving a signal flow diagram from the wave equations the following hint which refers to FIG. 12 should be given. At first the individual ports with their input and output units should be selected. Then one should commence with a first output unit for instance with $b_{11}$. Then, in order to satisfy the equation (64) a connection to an adder Add 1 has to be provided which is supplied by $a_{11}$ and $\beta_{11}C_5$. In order to provide the negative sign of $\beta_{11}C_5$ in equation (64) correspondingly a sign inverter has to be placed ahead. $\beta_{11}C_5$ is directly derived from a multiplier mult $\beta_{11}$ which receives the initial quantity $C_5$. $C_5$ itself comes from an adder Add 2 into which $a_{11}$, $a_{31}$ etc., are supplied. If thus, for $b_{11}$ the signal flow diagram is obtained, the signal flow diagram for the next output unit, for instance $b_{32}$, is derived, etc., up to the last output unit $b_{22}$. As final result the total signal flow diagram is obtained as is illustrated in FIG. 12.

Although the invention has been described with respect to preferred embodiments, it is not to be so limited as changes and modifications can be made which are within the full intended scope as defined by the appended claims.

We claim as our invention:

1. A filter with frequency-dependent transmission properties for an electrical analog signal which has been converted to digital form, the filter comprising a basic filter circuit which corresponds to an analog LC circuit for analog signals, said basic filter circuit comprising reactive single port circuit means having transit time for realizing inductive and capactive two-terminal circuit elements of said analog LC circuit, non-reactive circuit means for realizing non-reactive circuit elements of said analog LC circuit, said reactive circuit means and said non-reactive circuit means having respective ports with respective different port impedances in accordance with the parameters of said analog LC circuit, and interface means for interconnecting the reactive and non-reactive circuit means in accordance with the configuration of said analog LC circuit and comprising adaptors for providing impedance matching between the circuit means, each adaptor having a plurality of adaptor ports and comprising an adaptor circuit including adders and multipliers connected with the adaptor ports thereof and determining the respective port impedances of such adaptor ports and such that there is impedance matching at each port of each adaptor to the impedance of the associated connected port, wherein the improvement comprises: a plurality of said adaptors being directly connected, respective pairs of directly connected adaptors each having respective directly connected adaptor ports including respective port input and port output units, the respective port output units of the respective directly connected adaptor ports of each pair of directly connected adaptors being directly connected to the respective port input units of the respective other one of the directly connected adaptor ports, and one adaptor of each pair of directly connected adaptors having at least three adaptor ports including the directly connected adaptor port thereof and the associated adaptor circuit providing decoupling between the port input and the port output unit of the last mentioned directly connected adaptor port, and the directly connected adaptor ports of the respective pairs of directly connected adaptors having matched port impedances.

2. A filter according to claim 1, where the one adaptor of each pair of directly corrected adaptors with at least three adaptor ports including the directly connected adaptor port has its associated adaptor circuit providing decoupling between the port input and the port output unit of such directly connected adaptor port by using a multiplier in the circuit for such directly connected adaptor port which has a multiplication factor of one or is replaced by a direct connection.

3. A filter according to claim 2, wherein an adaptor of a pair of directly connected adaptors with at least four adaptor ports including the directly connected adaptor port has $n$ ports with respective port impedances, and has $p$ respective port impedances of equal value, the associated adaptor circuit having $m$ multipliers excluding any multiplier with a multiplication factor of one in the circuit for such directly connected adaptor port, where $m$ is not greater than $n$ minus $p$.

4. A filter according to claim 1 wherein a plurality of directly connected adaptors are combined to form a derived adaptor having an equivalent electric circuit.

5. In a filter with frequency-dependent transmission properties for an electrical analog signal which has been converted to digital form, the filter comprising reactive single port circuit means having transit time for realizing inductive and capactive elements of an analog circuit and having respective ports with respective different port impedances in accordance with the parameters of said analog circuit, and interface means for interconnecting the reactive single port circuit means in accordance with the configuration of said analog circuit and effectively comprising adaptors for providing impedance matching between the circuit means, each adaptor having a plurality of adaptor ports and the adaptors comprising adaptor circuits including adders and multipliers connected with the adaptor ports thereof and determining the respective port impedances of such adaptor ports and such that there is impedance matching at each port of each adaptor to the impedance of an associated connected port, wherein the improvement comprises: the filter effectively including a plurality of directly connected adaptors each pair of such directly connected adaptors having respective directly connected adaptor ports including respective port input and port output units, the respective port output units of the respective directly connected adaptor ports of said pair of directly connected adaptors being directly connected to the respective port input units of the respective other one of the directly connected adaptor ports, and one adaptor of said pair of directly connected adaptors comprising a parallel adaptor with at least three adaptor ports including the directly connected adaptor port and having a parallel adaptor circuit including adder and multiplier components such that if the adaptor ports are designated generically by the letter $\nu$ and $\nu$ is assigned the integer values 1, 2, . . . , $n$ when specifying respective individual ones of such adaptor ports, the value $n$ being taken as specifying the directly connected adaptor port, and if each multiplier component of the parallel adaptor circuit of such parallel adaptor is assigned a multiplication factor generically designated $\alpha\nu$ and is considered to be associated with an adaptor port having a port impedance $R_\nu$, then $\alpha_\nu = 2\ G_\nu/G$ where $G_\nu = 1/R_\nu$ and $G = G_1 + G_2 + \ldots + G_n$, the multiplication factor $\alpha n$ associated with the directly connected adaptor port being chosen to equal one so that $G_n = G_1 + G_2 \ldots + G_{n-1}$.

6. In a filter with frequency-dependent transmission properties for an electrical analog signal which has been converted to digital form, the filter comprising reactive single port circuit means having transit time for realizing inductive and capactive elements of an analog circuit and having respective ports with respective different port impedances in accordance with the parameters of said analog circuit, and interface means for interconnecting the reactive single port circuit means in accordance with the configuration of said analog circuit and effectively comprising adaptors for providing impedance matching between the circuit means, each adaptor having a plurality of adaptor ports and the adaptors comprising adaptor circuits including adders and multipliers connected with the adaptor ports thereof and determining the respective port impedances of such adaptor ports and such that there is impedance matching at each port of each adaptor to the impedance of an associated connected port, wherein the improvement comprises: the filter effectively including a plurality of directly connected adaptors each pair of such directly connected adaptors having respective directly connected adaptor ports including respective port input and port output units, the respective port output units of the respective directly connected adaptor ports of said pair of directly connected adaptors being directly connected to the respective port input units of the respective other one of the directly connected adaptor ports, and one adaptor of said pair of directly connected adaptors comprising a series adaptor with at least three adaptor ports including the directly connected adaptor port and having a series adaptor circuit including adder and multiplier components such that if the adaptor ports are designated generically by the letter $\nu$ and $\nu$ is assigned the integer values 1, 2, . . . , $n$ when specifying respective individual ones of such adaptor ports, the value $n$ being taken as specifying the directly connected adaptor port, and if each multiplier component of the series adaptor circuit of such series adaptor is assigned a multiplication factor generically designated $\alpha_\nu$ and is considered to be associated with an adaptor port having a port impedance $R_\nu$, then $\alpha_\nu = R_\nu/R$ where $R = R_1 + R_2 + \ldots + R_n$, the multiplication factor $\alpha n$ associated with the directly connected adaptor port being chosen to be equal to one so that $R_n$, the port impedance of such directly connected adaptor port, satisfies the relation $R_n = R_1 + R_2 + \ldots + R_{n-1}$.

7. A ladder filter effectively comprisingg a plurality of cascaded adaptors each having an input port, an output port and at least one further port with respective port impedances, reactance circuit elements having ports with port impedances in accordance with the reactance values represented thereby connected with the further ports of the adaptors, each of the adaptors including adders and multipliers connected with the ports thereof and determining the port impedances for matching the port impedance of each further port to the port impedance of the connected reactance circuit element, and for matching the respective port impedances of the input port and output port with those of the respective connected output port and input port of respective preceding and succeeding adaptors cascaded therewith, at least certain of the adaptors being equivalent to cascaded directly connected parallel and series adaptors, one such directly connected adaptor having respective adaptor ports designated $\nu$ where $\nu = 1, 2, \ldots, n$, the multiplier constants $\alpha_\nu$ for the multipliers associated with such ports being selected to provide impedance matching at the respective ports of such directly connected adaptor and including a multiplier with a multiplier constant $\alpha_n$, associated with the directly connected port of said directly connected adaptor, the value of such multiplier $\alpha_n$ being set equal to 1.

8. A ladder filter according to claim 7 with the one ddirectly connected adaptor being a parallel adaptor with its multipliers having multiplier constants satisfying the relationship $\alpha_\nu = G_\nu/G$ where $G_\nu$ is equal to the reciprocal of the port impedance of the associated port, and $G = G_1 + G_2 + \ldots + G_n$, the reciprocal of the port impedance of the directly connected port being designated $G_n$ and satisfying the relation $G_n = G_1 + G_2 + \ldots + G_{n-1}$.

9. A ladder filter according to claim 7 with the one directly connected adaptor being a series adaptor with its multipliers having multiplier constants satisfying the relationship $\alpha_\nu = R_\nu/R$ where $R_\nu$ is the port impedance of the associated port and $R = R_1 + R_2 + \ldots + R_n$, the port impedance of the directly connected port being designated $R_n$ and satisfying the relation $R_n = R_1 + R_2 + \ldots + R_{n-1}$.

* * * * *